(12) United States Patent
Sudo

(10) Patent No.: US 11,966,155 B2
(45) Date of Patent: Apr. 23, 2024

(54) IMAGING APPARATUS THAT, UNDER CERTAIN CONDITIONS, DISPLAYS ONE OR BOTH OF AN AUTOFOCUS FRAME AND A LINE-OF-SIGHT POINTER, AND METHOD FOR CONTROLLING THE SAME

(71) Applicant: CANON KABUSHIKI KAISHA, Tokyo (JP)

(72) Inventor: Koji Sudo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/170,444

(22) Filed: Feb. 16, 2023

(65) Prior Publication Data

US 2023/0194956 A1 Jun. 22, 2023

Related U.S. Application Data

(63) Continuation of application No. 17/064,472, filed on Oct. 6, 2020, now Pat. No. 11,609,481.

(30) Foreign Application Priority Data

Oct. 24, 2019 (JP) ................................ 2019-193889

(51) Int. Cl.
*G03B 7/12* (2021.01)
*G03B 17/14* (2021.01)
(Continued)

(52) U.S. Cl.
CPC ............... *G03B 7/12* (2013.01); *G03B 17/14* (2013.01); *G03B 17/563* (2013.01); *G06T 7/70* (2017.01); *G03B 2213/025* (2013.01)

(58) Field of Classification Search
CPC ........ G03B 7/12; G03B 17/14; G03B 17/563; G03B 2213/025; G03B 17/38; G06T 7/70;
(Continued)

(56) References Cited

U.S. PATENT DOCUMENTS

2004/0212712 A1* 10/2004 Stavely .................. A61B 3/113
348/333.03
2007/0081090 A1* 4/2007 Singh ................... H04N 23/631
(Continued)

FOREIGN PATENT DOCUMENTS

JP 07-184089 A 7/1995
JP 08-191797 A 7/1996
(Continued)

*Primary Examiner* — Usman A Khan
(74) *Attorney, Agent, or Firm* — CANON U.S.A., INC. IP Division

(57) ABSTRACT

An imaging apparatus includes an image capturing unit, a shutter button with which to give an image capturing instruction, a specific operation member, a reception unit configured to receive a line-of-sight input that is an input of a position based on a line of sight of a user, and a control unit configured to perform control so that, in a case where a predetermined operation on the specific operation member is not performed while a specific operation on the shutter button is being performed, a specified position is not moved based on the line-of-sight input in a case where a line-of-sight position of the line-of-sight input moves, and in a case where the predetermined operation on the specific operation member is performed while the specific operation on the shutter button is being performed, the specified position is moved based on the line-of-sight position of the line-of-sight input.

16 Claims, 8 Drawing Sheets

(51) Int. Cl.
*G03B 17/56* (2021.01)
*G06T 7/70* (2017.01)

(58) Field of Classification Search
CPC ... G06F 3/0484; G06F 3/0488; H04N 23/611;
H04N 23/631; H04N 23/71; H04N 23/73;
H04N 23/75; H04N 23/80
USPC .................................................. 348/207.99
See application file for complete search history.

(56) References Cited

U.S. PATENT DOCUMENTS

| | | | | |
|---|---|---|---|---|
| 2010/0283970 | A1* | 11/2010 | Sekiguchi | A61B 3/12 |
| | | | | 351/206 |
| 2012/0050556 | A1* | 3/2012 | Hamada | H04N 23/67 |
| | | | | 348/220.1 |
| 2013/0155309 | A1* | 6/2013 | Hill | H04N 23/635 |
| | | | | 348/E5.045 |
| 2015/0256737 | A1* | 9/2015 | Saito | H04N 23/672 |
| | | | | 348/349 |

FOREIGN PATENT DOCUMENTS

| | | |
|---|---|---|
| JP | 11-338041 A | 12/1999 |
| JP | 2000-028899 A | 1/2000 |
| JP | 2016-142925 A | 8/2016 |

\* cited by examiner

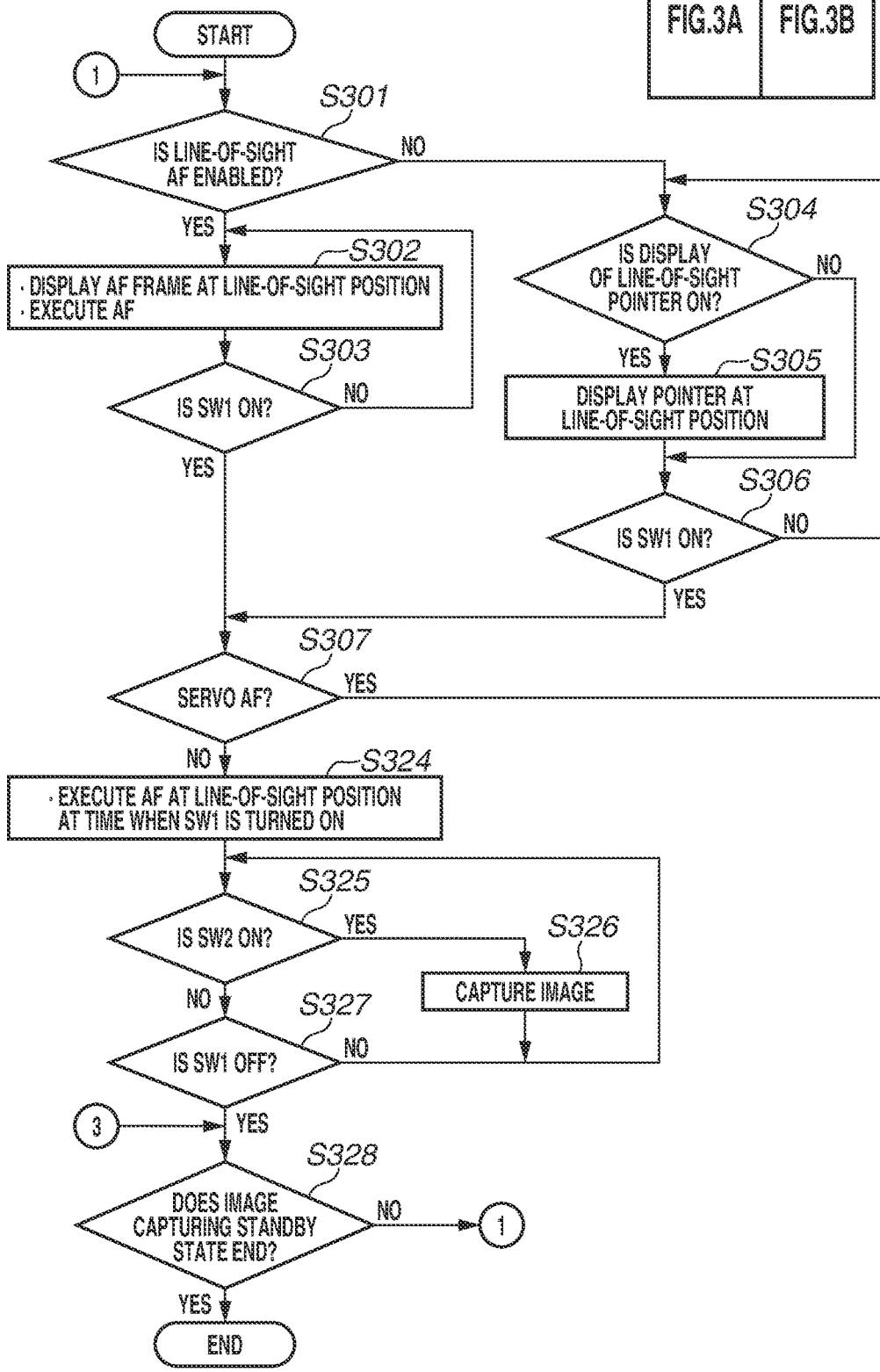

FIG.5A

| | | 502a 501a |
|---|---|---|
| 501 — | AF OPERATION | ONE-SHOT / SERVO |
| 502 — | LINE-OF-SIGHT AF | ENABLED / DISABLED |
| 503 — | LINE-OF-SIGHT INPUT | ENABLED / DISABLED |
| 504 — | LINE-OF-SIGHT POINTER | ON / OFF |

| | | |
|---|---|---|
| 505 — | ASSIGNMENT OF LINE-OF-SIGHT UPDATE FUNCTION | AF-ON BUTTON — 505a |
| | | AE LOCK BUTTON |
| | | PUSHING IN OF MULTI-CONTROLLER |
| | | TOUCH PUSH |
| | | NO ASSIGNMENT — 505b |

IMAGING APPARATUS THAT, UNDER CERTAIN CONDITIONS, DISPLAYS ONE OR BOTH OF AN AUTOFOCUS FRAME AND A LINE-OF-SIGHT POINTER, AND METHOD FOR CONTROLLING THE SAME

CROSS-REFERENCE TO RELATED APPLICATIONS

This application is a Continuation of U.S. application Ser. No. 17/064,472, filed Oct. 6, 2020, which claims priority to Japanese Patent Application No. 2019-193889, filed Oct. 24, 2019, each of which is hereby incorporated by reference herein in their entirety.

BACKGROUND

Field

The present disclosure relates to an imaging apparatus that can receive a line-of-sight input based on the line of sight of a user, and a method for controlling an imaging apparatus.

Description of the Related Art

Conventionally, there has been proposed a camera that detects the line-of-sight direction of a photographer as a user, detects which region (position) in the field of view of a viewfinder the photographer observes, and controls an image capturing function such as automatic focus adjustment. Japanese Patent Application Laid-Open No. 61-61135 discusses a camera that, when a user presses a shutter button, detects a line-of-sight position at the time when the shutter button is pressed, displays the line-of-sight position in a viewfinder, and focuses on an object according to the line-of-sight position. Japanese Patent Application Laid-Open No. 9-61700 discusses a technique for, while continuous image capturing is performed by keeping pressing a shutter button, detecting the line-of-sight position of a user every time an image is captured, and adjusting focus to the line-of-sight position. Japanese Patent Application Laid-Open No. 2001-100903 discusses a technique for detecting the line of sight of a user and moving a cursor to the line-of-sight position of the detected line of sight. In Japanese Patent Application Laid-Open No. 2001-100903, a cursor tracking mode where the cursor tracks the line-of-sight position of the user can be switched to on or off based on any one of the gesture, the voice, the line of sight, and the operation of the user.

In Japanese Patent Application Laid-Open No. 61-61135, however, the camera focuses on the object according to the line-of-sight position at the time when the shutter button is pressed first. Thus, if the object moves when the user performs continuous image capturing, a photograph where the object is out of focus is captured. In Japanese Patent Application Laid-Open No. 9-61700, during an operation on the shutter button, the user needs to continue to view a position on which the user wishes to focus. For example, there is a case where, if the user removes the line of sight from an object on which the user wishes to focus to check the entirety of an image during an operation on the shutter button, a position where the object desired by the user is not located comes into focus by tracking the line of sight. Thus, the user finds it difficult to use this technique. In Japanese Patent Application Laid-Open No. 2001-100903, the cursor tracking mode based on a line-of-sight input is switched to on or off. Thus, when the cursor tracking mode is on, the cursor always tracks the line-of-sight position based on a line-of-sight movement of the user regardless of whether intended or unintended by the user. To fix the cursor, it is necessary to switch the mode to off. To update the fixed cursor to the line-of-sight position, it is necessary to switch the mode from off to on again. Thus, the user may feel troublesome.

SUMMARY

The present disclosure is directed to, during an operation on a shutter button, updating a specified position based on a line-of-sight position at a timing desired by a user.

According to an aspect of the present disclosure, an imaging apparatus includes an image capturing unit, a reception unit configured to receive a line-of-sight input that is an input of a position based on a line of sight of a user, a shutter button with which to give an image capturing instruction, a specific operation member, and a control unit configured to perform control so that, in a case where a predetermined operation on the specific operation member is not performed while a specific operation on the shutter button is being performed, a specified position is not moved based on the line-of-sight input even in a case where a line-of-sight position of the line-of-sight input moves, and in a case where the predetermined operation on the specific operation member is performed while the specific operation on the shutter button is being performed, the specified position is moved based on the line-of-sight position of the line-of-sight input.

Further features of the present disclosure will become apparent from the following description of exemplary embodiments with reference to the attached drawings.

BRIEF DESCRIPTION OF THE DRAWINGS

FIGS. 3A and 3B are collectively a flowchart illustrating a process of controlling an autofocus (AF) frame based on a line-of-sight input and an operation member according to the present exemplary embodiment.

FIGS. 5A and 5B are examples of display of setting screens regarding a line of sight according to the present exemplary embodiment.

DESCRIPTION OF THE EMBODIMENTS

An exemplary embodiment will be described in detail below with reference to the accompanying drawings.

It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

An exemplary embodiment will be described below with reference to the drawings.

Figure 1A:
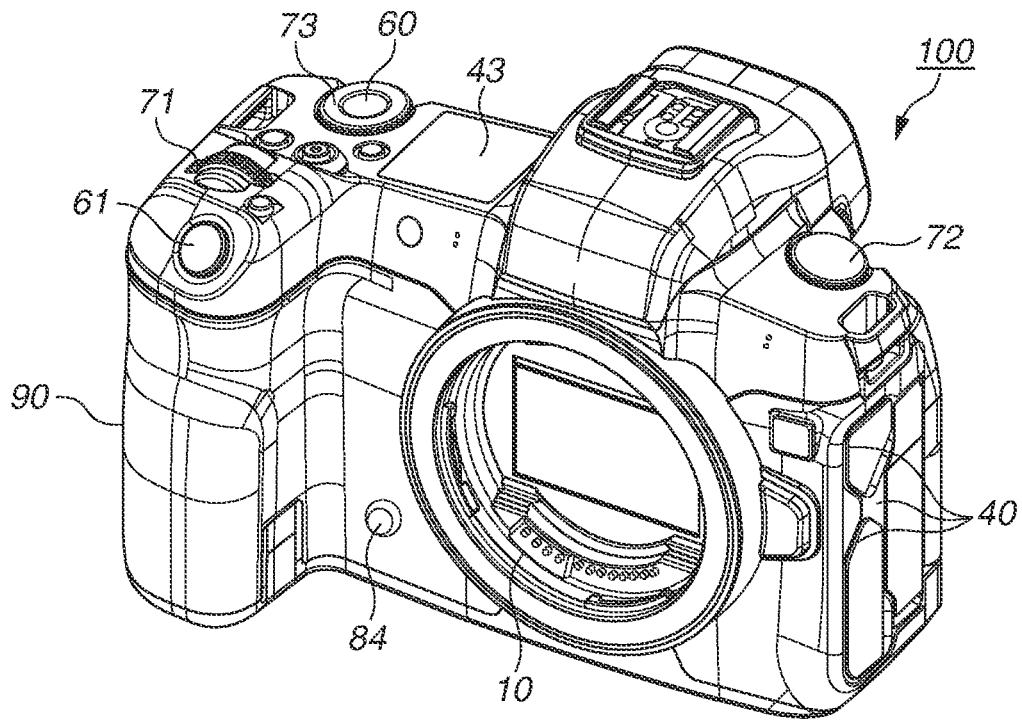
FIGS. 1A and 1B are external views of a digital camera according to an exemplary embodiment.
Figure 1B:
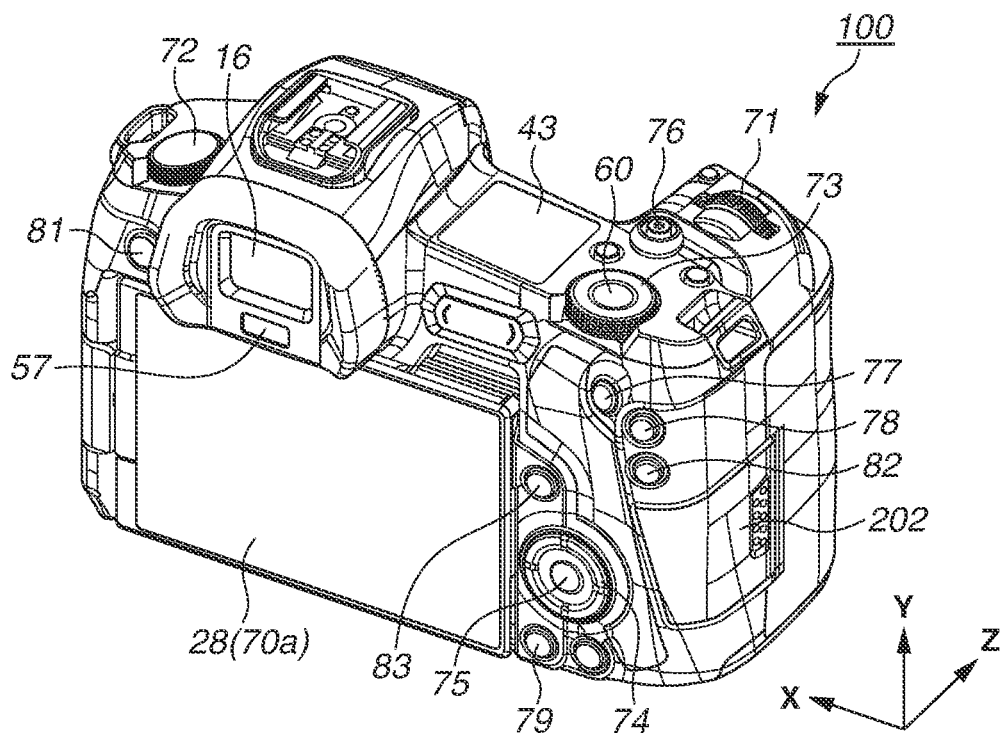

FIGS. 1A and 1B illustrate external views of a digital camera 100 as an example of an apparatus to which the present disclosure is applicable. FIG. 1A is a front perspective view of the digital camera 100. FIG. 1B is a rear perspective view of the digital camera 100. In FIGS. 1A and 1B, a display unit 28 is a display unit that is provided on the back surface of the camera 100 and displays an image and various pieces of information. A touch panel 70a is an operation member on which a touch operation can be performed. The touch panel 70a can detect a touch operation on a display surface (an operation surface) of the display unit 28. An outside-viewfinder display unit 43 is a display unit that is provided outside a viewfinder of the camera 100 and displays various setting values of the camera 100, such as the setting values of the shutter speed and the stop.

A shutter button 61 is an operation unit for giving an image capturing instruction. A mode selection switch 60 is an operation unit for switching various modes. A terminal cover 40 is a cover that protects a connector (not illustrated) for connecting an external device and the digital camera 100. A main electronic dial 71 is a rotary operation member included in an operation unit 70. The setting value of the shutter speed or the stop can be changed by rotating the main electronic dial 71. A power switch 72 is an operation member for turning on and off the digital camera 100. A sub electronic dial 73 is a rotary operation member included in the operation unit 70 and enables the movement of a selection frame or image advancement. A directional pad 74 is an operation member included in the operation unit 70 and including a push button that can be pressed in in four directions. The directional pad 74 enables an operation according to the direction in which the directional pad 74 is pressed. A SET button 75 is a push button included in the operation unit 70 and is mainly used to determine a selection item. A moving image button 76 is used to give an instruction to start or stop the capturing (recording) of a moving image. An AF-ON button 77 is included in the operation unit 70. The AF-ON button 77 is pressed, whereby an autofocus (AF) operation is started. Although the AF operation is started mainly by pressing the shutter button 61, an instruction to start the AF operation can be also given by pressing the AF-ON button 77. In the digital camera 100 in which a setting can be made so that the AF operation is not performed by pressing the shutter button 61, an AF start instruction and an image capturing instruction can be separated from each other. If the shutter button 61 is pressed after the AF-ON button 77, an image can be captured by fixing an AF position, or an image can be captured even in the situation where AF cannot be performed. An automatic exposure (AE) lock button 78 is included in the operation unit 70. The AE lock button 78 is pressed in an image capturing standby state, whereby an exposure state can be fixed. That is, an image can be captured at a fixed exposure value desired by a user. A reproduction button 79 is an operation button included in the operation unit 70 and used to switch an image capturing mode and a reproduction mode. The reproduction button 79 is pressed in the image capturing mode, whereby the image capturing mode transitions to the reproduction mode, and the most recent image among images recorded in a recording medium 200 can be displayed on the display unit 28. A stop-down button 84 is included in the operation unit 70. By pressing the stop-down button 84, a lens is stopped down at a stop value set when the stop-down button 84 is pressed. Thus, a range that actually comes into focus (the depth of field) can be confirmed. A menu button 81 is included in the operation unit 70. If the menu button 81 is pressed, a menu screen where various settings can be made is displayed on the display unit 28. An enlargement button 82 is an operation button included in the operation unit 70 and used to turn on and off an enlargement mode in live view display in the image capturing mode. The main electronic dial 71 is operated after the enlargement mode is turned on, a live view image can be enlarged and reduced. In the reproduction mode, the enlargement button 82 functions as an enlargement button for enlarging a reproduction image and increasing the enlargement ratio. A multi-controller 83 is an operation member including a direction key that can be operated in eight directions and a push button that can be pushed in. The multi-controller 83 enables an operation according to the direction in which the multi-controller 83 is tilted. The user can intuitively make various settings on the menu screen displayed on the display unit 28 using the directional pad 74, and the SET button 75, and the multi-controller 83. A framing assist button (not illustrated) is an operation button placed in a lens unit 150 or a lens adapter connecting the digital camera 100 and the lens unit 150. The framing assist button is an operation member placed at the position where the user can press the operation member by the left hand when capturing an image while holding a grip portion 90 by the right hand and holding the lens unit 150 by the left hand.

The operation unit 70 is a various-operation member as an input unit that receives operations from the user. The operation unit 70 includes a push button, a rotating dial, and a touch sensor and includes at least operation members such as the shutter button 61, the touch panel 70a, the main electronic dial 71, the power switch 72, the sub electronic dial 73, the directional pad 74, the SET button 75, the moving image button 76, the AF-ON button 77, the AE lock button 78, the reproduction button 79, the stop-down button 84, the menu button 81, the enlargement button 82, the multi-controller 83, and the framing assist button. Regarding a line-of-sight update function for updating an AF frame to a position based on a line-of-sight position, a dedicated button having the line-of-sight update function may be mounted on the digital camera 100, or the line-of-sight update function may be assigned to an operation member having another function. Examples of the operation member to which the line-of-sight update function can be assigned include the AF-ON button 77, the AE lock button 78, the stop-down button 84, the multi-controller 83 when pushed, and the framing assist button. The AF-ON button 77, the AE lock button 78, and the multi-controller 83 are each placed at the position where the user can operate the operation member without affecting the capturing of an image while operating the shutter button 61 with the right index finger. Specifically, in a state where the user is holding the grip portion 90 by the right hand, the operation member is arranged on the upper side (where the shutter button 61 is arranged) with respect to the center position of a back surface portion of the digital camera 100, which corresponds to the opposite side of an object, and also arranged on the right side (the grip portion 90 side) of an electronic viewfinder (EVF) 29. The operation member is placed needs not be arranged in the back surface portion of the digital camera 100 so long as the user can operate the operation member while operating the shutter button 61. For example, the operation member may be an operation member placed in a front surface portion (on the object side) of the lens unit 150, such as the stop-down button 84 or the framing assist button. In this case, the arrangement position of the operation member is not limited to the back surface of the digital camera 100, and the operation member only needs to be placed at the position where the user can operate the operation member with a finger other than the right index finger operating the shutter button 61. Even in a case where the operation member to which the line-of-sight update function can be assigned is arranged in the front surface portion of the digital camera 100, the user can press the operation member without affecting the capturing of an image while operating the shutter button 61, so long as the user can operate the operation member with the right middle finger or right ring finger holding the grip portion 90. The operation member to which the line-of-sight update function can be assigned by the user and which has another function is a button having the function of not transitioning from the image capturing mode even if the button is operated during an operation on the shutter button 61, or is a button having the function of not hindering the execution of an image capturing function according to an operation on the shutter button 61. Alternatively, the operation member may be a button to which various functions can be assigned and which can be pressed. The operation member needs not be a push button but may be an operation bar that can be operated to the left and right, or a ring that can be rotationally operated. Or if the touch panel 70a that can detect a pressing force is pressed by strong pressing force, the function may be started. In the present exemplary embodiment, if the digital camera 100 does not include a dedicated button having the line-of-sight update function, the line-of-sight update function is assigned to the AF-ON button 77 by default (the initial state before the digital camera 100 is shipped from the factory) unless the user changes a setting on a setting menu screen as illustrated in FIG. 5B. During an operation the shutter button 61, the user captures an image while firmly holding the grip portion 90 by the right hand. The grip portion 90 has a shape that makes it easy for the user to hold the grip portion 90, and is made of a material that enables the user to firmly hold the grip portion 90. That is, the grip portion 90 is formed of a material different from the materials of other portions of the housing of the digital camera 100 and is made of a rubber material that is easy to grip and has non-slip unevenness. Thus, the operation member needs to be at a reasonable position where the user can operate the operation member while firmly holding the grip portion 90 and easily press the operation member with the right thumb. For these reasons, the line-of-sight update function is assigned to the AF-ON button 77 unless the user changes the setting. This, however, assumes a general user. For a woman with small hands, it may be more convenient if the line-of-sight update function is assigned to another operation member other than the AF-ON button 77 by changing the setting content on the setting menu screen.

A communication terminal 10 is a communication terminal for the digital camera 100 to communicate with the lens unit 150 (attachable to and detachable from the digital camera 100). An eyepiece portion 16 is an eyepiece portion of an eyepiece viewfinder (a look-in type viewfinder). The user can visually confirm a video displayed on the EVF 29 in the eyepiece viewfinder through the eyepiece portion 16. An eye approach detection unit 57 is an eye approach detection sensor that detects whether the eye of a photographer approaches the eyepiece portion 16. A cover 202 is a cover of a slot in which the recording medium 200 is stored. The grip portion 90 is a holding portion having a shape that makes it easy for the user to grip the holding portion by the right hand when the user holds up the digital camera 100. The shutter button 61 and the main electronic dial 71 are arranged at the positions where the user can operate the shutter button 61 and the main electronic dial 71 with the right index finger in the state where the user is holding the digital camera 100 by gripping the grip portion 90 with the right little, ring, and middle fingers. Similarly, the sub electronic dial 73 is arranged at the position where the user can operate the sub electronic dial 73 with the right thumb in the same state.

Figure 2:
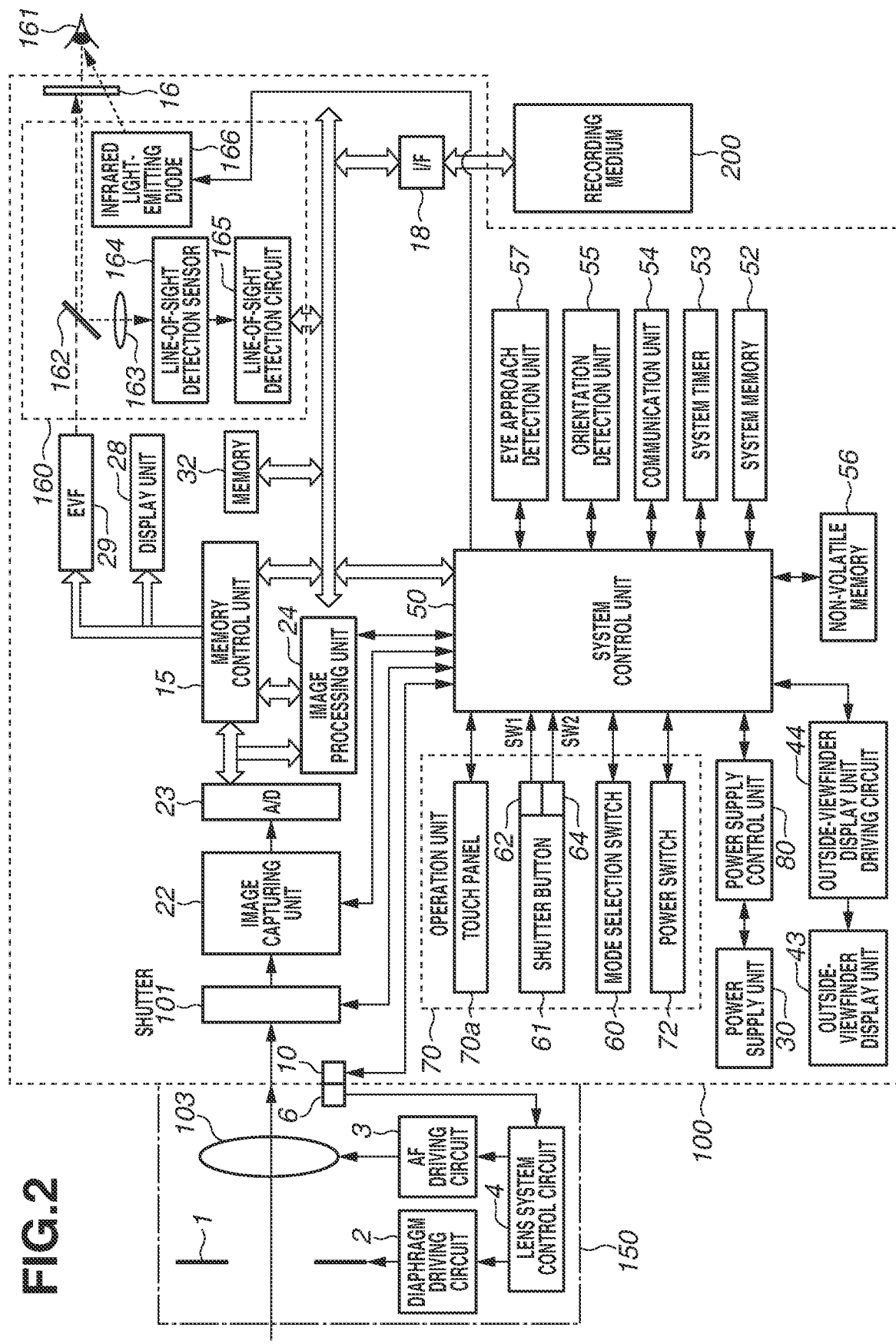
FIG. 2 is a block diagram illustrating a configuration of the digital camera according to the exemplary embodiment.

FIG. 2 is a block diagram illustrating an example of the configuration of the digital camera 100 according to the present exemplary embodiment. In FIG. 2, the lens unit 150 is a lens unit on which an interchangeable imaging lens is mounted. Although a lens 103 normally includes a plurality of lenses, FIG. 2 illustrates only a single lens in a simplified manner. A communication terminal 6 is a communication terminal for the lens unit 150 to communicate with the digital camera 100. The lens unit 150 communicates with a system control unit 50 via the communication terminals 6 and 10 and causes a lens system control circuit 4 within the lens unit 150 to control a diaphragm 1 via a diaphragm driving circuit 2. Then, the lens unit 150 displaces the lens 103 via an AF driving circuit 3 to bring the lens 103 into focus.

A shutter 101 is a focal-plane shutter capable of freely controlling the exposure time of an image capturing unit 22 by control of the system control unit 50.

The image capturing unit 22 is an image sensor composed of a charge-coupled device (CCD) or a complementary metal-oxide-semiconductor (CMOS) device, which converts an optical image into an electric signal. An analog-to-digital (A/D) converter 23 is used to convert an analog signal output from the image capturing unit 22 into a digital signal.

An image processing unit 24 performs a predetermined pixel interpolation process, a resizing process, such as reduction, and a color conversion process on data from the A/D converter 23 or data from a memory control unit 15. The image processing unit 24 performs a predetermined calculation process using captured image data. The system control unit 50 performs exposure control and distance measurement control based on the calculation result obtained by the image processing unit 24. Consequently, an AF process, an AE process, and an electronic flash pre-emission (EF) process are performed by a through-the-lens (TTL) method. The image processing unit 24 further performs a predetermined calculation process using captured image data and performs an auto white balance (AWB) process by the TTL method based on the obtained calculation result.

The memory control unit 15 controls the transmission and reception of data between the A/D converter 23, the image processing unit 24, and a memory 32. Output data from the A/D converter 23 is written directly to the memory 32 via the image processing unit 24 and the memory control unit 15 or via the memory control unit 15. The memory 32 stores image data obtained by the image capturing unit 22 and converted into digital data by the A/D converter 23 and image data to be displayed on the display unit 28 or the EVF 29. The memory 32 includes a sufficient storage capacity for storing a predetermined number of still images and a predetermined length of a moving image and sound.

The memory 32 also serves as a memory for image display (a video memory). Image data for display written in the memory 32 is displayed on the display unit 28 or the EVF 29 via the memory control unit 15. The display unit 28 or the EVF 29 performs display on a display device such as a liquid crystal display (LCD) or an organic electroluminescent (EL) display according to a signal from the memory control unit 15. Data is converted into digital data by the A/D converter 23, and the digital data is accumulated in the memory 32 and sequentially transferred to and displayed on the display unit 28 or the EVF 29. In other words, the display unit 28 or the EVF 29 performs live view display (LV display). Hereinafter, an image displayed in live view will be referred to as a "live view image (LV image)".

An infrared light-emitting diode 166 is a light-emitting element for detecting the line-of-sight position of the user on a screen in the viewfinder and emits infrared light to an eyeball (eye) 161 of the user. The infrared light emitted from the infrared light-emitting diode 166 is reflected by the eyeball (eye) 161, and the reflected infrared light reaches a dichroic mirror 162. The dichroic mirror 162 reflects only infrared light and transmits visible light. The reflected infrared light of which the optical path is changed forms an image on the imaging surface of a line-of-sight detection sensor 164 through an imaging lens 163. The imaging lens 163 is an optical member included in a line-of-sight detection optical system. The line-of-sight detection sensor 164 includes an imaging device such as a CCD image sensor.

The line-of-sight detection sensor 164 photoelectrically converts the reflected infrared light incident on the line-of-sight detection sensor 164 into an electric signal and outputs the electric signal to a line-of-sight detection circuit 165. The line-of-sight detection circuit 165 includes at least one processor. Based on the output signal of the line-of-sight detection sensor 164, the line-of-sight detection circuit 165 detects the line-of-sight position of the user from the image or the motion of the eyeball (eye) 161 of the user and outputs detection information to the system control unit 50. As described above, a line-of-sight detection block 160 includes the dichroic mirror 162, the imaging lens 163, the line-of-sight detection sensor 164, the infrared light-emitting diode 166, and the line-of-sight detection circuit 165. The line-of-sight detection block 160 is one of reception units that receive a line-of-sight input.

In the present disclosure, using the line-of-sight detection block 160, the line of sight is detected by a method termed a corneal reflection method. The corneal reflection method is a method for detecting the direction and the position of the line of sight based on the positional relationship between reflected light obtained by particularly the cornea of the eyeball (eye) 161 reflecting infrared light emitted from the infrared light-emitting diode 166, and the pupil of the eyeball (eye) 161. There are also various other methods for detecting the direction and the position of the line of sight, such as a method termed a scleral reflection method using the difference in reflectance of light between the iris of the eye and the white of the eye. Alternatively, any line-of-sight detection method other than the above may be used so long as the method can detect the direction and the position of the line of sight.

The outside-viewfinder display unit 43 displays various setting values of the camera 100, such as the setting values of the shutter speed and the stop, via an outside-viewfinder display unit driving circuit 44.

A non-volatile memory 56 is an electrically erasable and recordable memory. As the non-volatile memory 56, for example, a flash read-only memory (ROM) is used. The non-volatile memory 56 stores a constant for the operation of the system control unit 50 and a program. The "program" as used herein refers to a program for executing various flow charts described below in the present exemplary embodiment.

The system control unit 50 is a control unit including at least one processor or circuit and controls the entirety of the digital camera 100. The system control unit 50 executes the above program recorded in the non-volatile memory 56, thereby achieving processes described later in the present exemplary embodiment. As a system memory 52, for example, a random-access memory (RAM) is used. A constant and a variable for the operation of the system control unit 50 and the program read from the non-volatile memory 56 are loaded into the system memory 52. The system control unit 50 also controls the memory 32 and the display unit 28 to perform display control.

A system timer 53 is a time measurement unit for measuring the time used for various types of control and the time of a built-in clock.

The mode selection switch 60 is an operation member included in the operation unit 70 and used to switch the operation mode of the system control unit 50 to either of a still image capturing mode and a moving image capturing mode. The still image capturing mode includes an auto image capturing mode, an auto scene distinction mode, a manual mode, a stop priority mode (an Av mode), a shutter speed priority mode (a Tv mode), and a program AE mode (a P mode). The still image capturing mode also includes various scene modes in which image capturing settings are made according to image capturing scenes, and a custom mode. Using the mode selection switch 60, the user can directly switch to any one of these modes. Alternatively, using the mode selection switch 60, the user may once switch to a list screen where image capturing modes are listed, then select any one of the plurality of modes displayed on the list screen, and switch to the selected mode using another operation member. Similarly, the moving image capturing mode may also include a plurality of modes.

A first shutter switch 62 is turned on in an intermediate state of an operation, i.e., by a half press (an image capturing preparation instruction), on the shutter button 61 provided in the digital camera 100 and generates a first shutter switch signal SW1. Based on the first shutter switch signal SW1, the system control unit 50 starts an image capturing preparation operation such as an AF process, an AE process, an AWB process, or an EF process.

A second shutter switch 64 is turned on by the completion of an operation, i.e., by a full press (an image capturing instruction), on the shutter button 61 and generates a second shutter switch signal SW2. Based on the second shutter switch signal SW2, the system control unit 50 starts a series of operations of an image capturing process from reading of a signal from the image capturing unit 22 to writing of a captured image as an image file to the recording medium 200. If the on state of the second shutter switch 64 is continued, the digital camera 100 performs continuous image capturing at a speed depending on the speed determined in advance at which images can be continuously captured.

A power supply control unit 80 includes a battery detection circuit, a direct-current-to-direct-current (DC/DC) converter, and a switch circuit for switching blocks to be supplied with a current. The power supply control unit 80 detects the presence or absence of a battery attached, the type of a battery, and the remaining life of a battery. The power supply control unit 80 controls the DC/DC converter based on the detection results and an instruction from the system control unit 50 and supplies a required voltage to the components including the recording medium 200 for a required period. A power supply unit 30 includes a primary battery such as an alkaline battery or a lithium battery, a secondary battery such as a nickel-cadmium (NiCd) battery, a nickel-metal hydrate (NiMH) battery, or a lithium-ion (Li) battery, or an alternating current (AC) adapter.

A recording medium interface (I/F) 18 is an interface with the recording medium 200 such as a memory card or a hard disk. The recording medium 200 is a recording medium, such as a memory card, for recording a captured image and is composed of a semiconductor memory or a magnetic disk.

A communication unit 54 connects to an external device wirelessly or via a cable for a wired connection, and transmits and receives a video signal and a sound signal to and from the external device. The communication unit 54 can also connect to a wireless local area network (LAN) and the Internet. The communication unit 54 can communicate with the external device also using Bluetooth (registered trademark) or Bluetooth Low Energy. The communication unit 54 can transmit an image (including a live view image) captured by the image capturing unit 22 or an image stored in the recording medium 200 to the external device and also receive an image or various other pieces of information from the external device.

An orientation detection unit 55 detects the orientation of the digital camera 100 relative to the direction of gravity. Based on the orientation detected by the orientation detection unit 55, the system control unit 50 can determine whether an image captured by the image capturing unit 22 is captured in a state where the digital camera 100 is being held up horizontally or in a state where the camera 100 is being held up vertically. The system control unit 50 can add direction information according to the orientation detected by the orientation detection unit 55 to an image file of an image captured by the image capturing unit 22 or record the image by rotating the image based on the orientation detected by the orientation detection unit 55. As the orientation detection unit 55, an acceleration sensor or a gyro sensor can be used. Using the acceleration sensor or the gyro sensor as the orientation detection unit 55, the system control unit 50 can also detect the motion of the digital camera 100 (whether the digital camera 100 is panned, tilted, lifted, or at rest).

The eye approach detection unit 57 is an eye approach detection sensor that detects the approach (eye approach) and the separation (eye separation) of the eye (a physical body) 161 to and from the eyepiece portion 16 of the viewfinder (approach detection). According to a state detected by the eye approach detection unit 57, the system control unit 50 switches a display state and a non-display state of the display unit 28 and the EVF 29. More specifically, in a case where at least the digital camera 100 is in an image capturing standby state, and the switching setting of the display destination of a live view image captured by the image capturing unit 22 is an automatic switching setting, and while the eye does not approach, the display destination is set to the display unit 28, the display of the display unit 28 is turned on, and the EVF 29 is set to the non-display state. While the eye approaches, the display destination is set to the EVF 29, the display of the EVF 29 is turned on, and the display unit 28 is set to the non-display state. As the eye approach detection unit 57, for example, an infrared proximity sensor can be used. The eye approach detection unit 57 can detect the approach of some physical body to the eyepiece portion 16 of the viewfinder having the EVF 29 built-in. If a physical body approaches, infrared light projected from a light projection portion (not illustrated) of the eye approach detection unit 57 is reflected by the physical body. Then, the reflected infrared light is received by a light reception portion (not illustrated) of the infrared proximity sensor. According to the amount of the received infrared light, it is also possible to determine at what distance from the eyepiece portion 16 the approaching physical body is (an eye approach distance). As described above, the eye approach detection unit 57 performs eye approach detection for detecting the distance from a physical body approaching the eyepiece portion 16. In the present exemplary embodiment, the light projection portion and the light reception portion of the eye approach detection unit 57 are devices separate from the infrared light-emitting diode 166 and the line-of-sight detection sensor 164. The infrared light-emitting diode 166, however, may concurrently serve as the light projection portion of the eye approach detection unit 57. Further, the line-of-sight detection sensor 164 may concurrently serve as the light reception portion. In a non-eye approach state (a non-approach state), if a physical body approaching the eyepiece portion 16 within a predetermined distance from the eyepiece portion 16 is detected, it is detected that the eye has approached. In an eye approach state (an approach state), if a physical body of which the approach has been detected separates from the eyepiece portion 16 at a predetermined distance or more, it is detected that the eye has separated. A threshold for detecting eye approach and a threshold for detecting eye separation may be different from each other, for example, by providing hysteresis. After eye approach is detected, the eye approach state continues until eye separation is detected. After eye separation is detected, the non-eye approach state continues until eye approach is detected. The infrared proximity sensor is merely an example, and another sensor may be employed as the eye approach detection unit 57 so long as the sensor can detect the approach of the eye or a physical body that can be regarded as eye approach.

Based on output from the line-of-sight detection block 160, the system control unit 50 can detect the following operations or states:

the state where the user whose eye approaches the eyepiece portion 16 provides a line-of-sight input, the state where the user whose eye approaches the eyepiece portion 16 gazes, the state where the user whose eye approaches the eyepiece portion 16 shifts the line of sight that has been input, i.e., the end of a line-of-sight input, and the state where the user whose eye approaches the eyepiece portion 16 does not provide any line-of-sight input.

The "gaze" as used herein refers to a case where the line-of-sight position of the user does not move over a predetermined amount of movement within a predetermined time.

The touch panel 70a and the display unit 28 can be integrally formed. For example, the touch panel 70a is configured so that the transmittance of light does not hinder the display of the display unit 28, and the touch panel 70a is attached to an upper layer of the display surface of the display unit 28. Then, input coordinates on the touch panel 70a are associated with display coordinates on the display screen of the display unit 28. Consequently, it is possible to provide a graphical user interface (GUI) as if the user can directly operate a screen displayed on the display unit 28. The system control unit 50 can detect the following operations on the touch panel 70a or the following states:

the state where a finger or a pen that has not touched the touch panel 70a newly touches the touch panel 70a, i.e., the start of a touch (hereinafter referred to as a "touch-down"), the state where the finger or the pen touches the touch panel 70a (hereinafter referred to as a "touch-on"), the state of moving the finger or the pen while the finger or the pen keeps touching the touch panel 70a (hereinafter referred to as a "touch move"), the state of separating from the touch panel 70a the finger or the pen having touched the touch panel 70a, i.e., the end of a touch (hereinafter referred to as a "touch-up"), and the state where nothing touches the touch panel 70a (hereinafter referred to as a "touch-off").

If a touch-down is detected, simultaneously, a touch-on is also detected. After the touch-down, normally, the touch-on continues to be detected unless a touch-up is detected. A touch move is detected also in the state where the touch-on is detected. Even if the touch-on is detected, a touch move is not detected unless the touch position moves. After a touch-up of all the fingers or the pen having touched the touch panel 70a is detected, a touch-off is detected.

The system control unit 50 is notified via an internal bus of these operations and states and the position coordinates where the finger or the pen touches the touch panel 70a. Based on the information of which the system control unit 50 is notified, the system control unit 50 determines what operation (touch operation) is performed on the touch panel 70a. In the case of a touch move, the system control unit 50 can also determine, based on changes in the position coordinates, the moving direction of the finger or the pen moving on the touch panel 70a with respect to each of the vertical and horizontal components on the touch panel 70a. If a touch move performed by a predetermined distance or more is detected, the system control unit 50 determines that a slide operation is performed. The operation of quickly moving the finger by some distance while the finger keeps touching the touch panel 70a, and then separating the finger from the touch panel 70a immediately after the quick movement is referred to as a "flick". In other words, the flick is the operation of quickly tracing the touch panel 70a with the finger in a flipping manner. If a touch move performed by a predetermined distance or more at a predetermined speed or more is detected, and a touch-up is detected immediately after the touch move, the system control unit 50 can determine that a flick is performed (can determine that a flick is performed following a slide operation). Further, a touch operation for simultaneously touching a plurality of places (e.g., two points) and bringing the touch positions closer to each other is referred to as a "pinch-in", and a touch operation for separating the touch positions from each other is referred to as a "pinch-out". The pinch-out and the pinch-in are collectively referred to as a "pinch operation" (or simply as a "pinch"). The touch panel 70a may be a touch panel of any of various types such as a resistive type, a capacitive type, a surface acoustic wave type, an infrared type, an electromagnetic induction type, an image recognition type, and a photosensor type. There are a method for detecting the presence of a touch according to the presence of the contact of the finger or the pen with the touch panel 70a, and a method for detecting the presence of a touch according to the presence of the approach of the finger or the pen to the touch panel 70a, which depends on the type, and either method can be used.

Figure 3B:
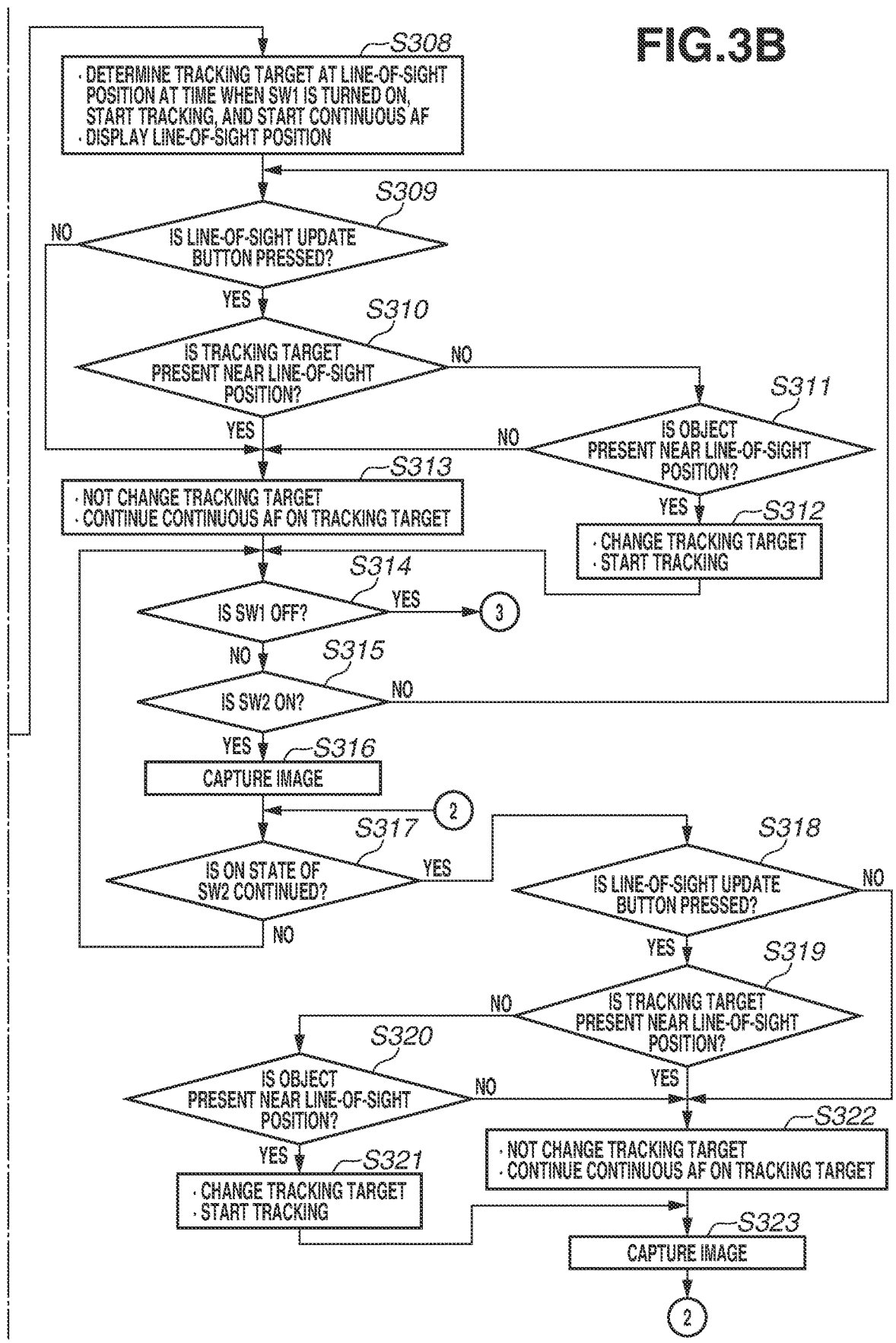

In the present exemplary embodiment, an example is described where, in the digital camera 100, control is performed so that an AF frame is not moved based on a line-of-sight input during an operation on the shutter button 61. Then, if an operation on a specific operation member is performed, the AF frame is updated to a position based on a line-of-sight position. FIGS. 3A and 3B are a flowchart in which the movement of an AF frame based on a line-of-sight input during an operation on the shutter button 61 is controlled based on an operation on an operation member. This control process is achieved by the system control unit 50 loading a program stored in the non-volatile memory 56 into the system memory 52 and executing the program. The flowchart in FIGS. 3A and 3B is started in a case where the digital camera 100 is started in an image capturing mode, and the user is looking into the viewfinder in an image capturing standby state, i.e., when a setting regarding a line-of-sight input function is enabled in an eye approach state where the eye is approaching the eyepiece portion 16. FIGS. 5A and 5B illustrate setting menu screens regarding capturing of an image to be displayed on the EVF 29 or the display unit 28. The setting menu screen in FIG. 5A displays items 501 to 504. Among these items, the item 503 is a setting item regarding the line-of-sight input function. The "line-of-sight input function" refers to a function regarding an operation based on the line of sight of the user. The line-of-sight input function can be set to either "enabled" or "disabled". If a setting candidate 503a is selected, the setting regarding the line-of-sight input function is enabled. If a setting candidate 503b is selected, the setting regarding the line-of-sight input function is disabled. If the line-of-sight input function is set to enabled, for example, a cursor can be moved or an item can be selected based on the line of sight on a setting menu screen. If the line-of-sight input function is set to disabled, for example, a cursor cannot be moved based on the line of sight. FIG. 5A illustrates the state where the setting of the line-of-sight input function is enabled. The setting of the line-of-sight input function is stored in the non-volatile memory 56. Alternatively, even in the case of a setting other than that on the setting menu screen as illustrated in FIG. 5A, the enabled and disabled states of the line-of-sight input function may be able to be switched by an operation on an operation member included in the digital camera 100 or a switching operation on a lever included in the digital camera 100.

Examples of a condition for determining a line-of-sight position in a case where a line-of-sight input is provided by the user include a gaze. If the line-of-sight detection block 160 detects a line-of-sight input, the system control unit 50 measures time from the time when the line-of-sight input is detected. The line-of-sight detection block 160 detects the line-of-sight position of the detected line-of-sight input, for example, every 30 milliseconds and sends the line-of-sight position to the system control unit 50. Based on the line-of-sight position and the measured time, the system control unit 50 can determine whether the user largely moves the line of sight (whether the user moves the line of sight around) or stares at a certain position (a gaze). Based on the line-of-sight position and the measured time, if the amount of movement of the line-of-sight position within a predetermined time is less than or equal to a predetermined threshold, the system control unit 50 determines that the user gazes. For example, if the amount of movement of the line-of-sight position is less than or equal to the predetermined threshold within 120 milliseconds, the system control unit 50 determines that the user gazes. If the line-of-sight position is determined based on the presence or absence of a gaze, the AF frame does not track an unintended line-of-sight movement unconsciously made by the user. Thus, it is possible to prevent the user from feeling troublesome. Although a gaze is taken as an example of the condition for determining that the line-of-sight position is intended by the user, an instruction based on the blink or the voice of the user may be used as the condition.

In step S301, with reference to the non-volatile memory 56, the system control unit 50 determines whether the setting of an AF function based on a line-of-sight input is enabled. If the line-of-sight AF setting is enabled (Yes in step S301), the processing proceeds to step S302. If not (No in step S301), the processing proceeds to step S304. The line-of-sight AF function is a function of displaying a focus detection region (hereinafter, an "AF frame") at a line-of-sight position detected by the line-of-sight detection block 160 and executing AF. As illustrated in the item 502 in FIG. 5A, the user can set the line-of-sight AF function to either "enabled" or "disabled" on a setting menu screen of the digital camera 100. If the setting regarding the line-of-sight AF function is enabled, the AF frame (i.e., the specified position) moves by tracking the line of sight, and AF is executed at the position of the displayed AF frame. If the setting regarding the line-of-sight AF function is disabled, the AF frame does not move by tracking the line of sight. Even if the line-of-sight input function is enabled, as long as the setting regarding the line-of-sight AF function is disabled, the AF frame does not move by tracking the line of sight even in the state where the line of sight of the user is detected. FIG. 5A illustrates the state where a setting candidate 502a is selected, and therefore, the line-of-sight AF setting is enabled. The content of the line-of-sight AF setting is stored in the non-volatile memory 56.

Figure 4A:
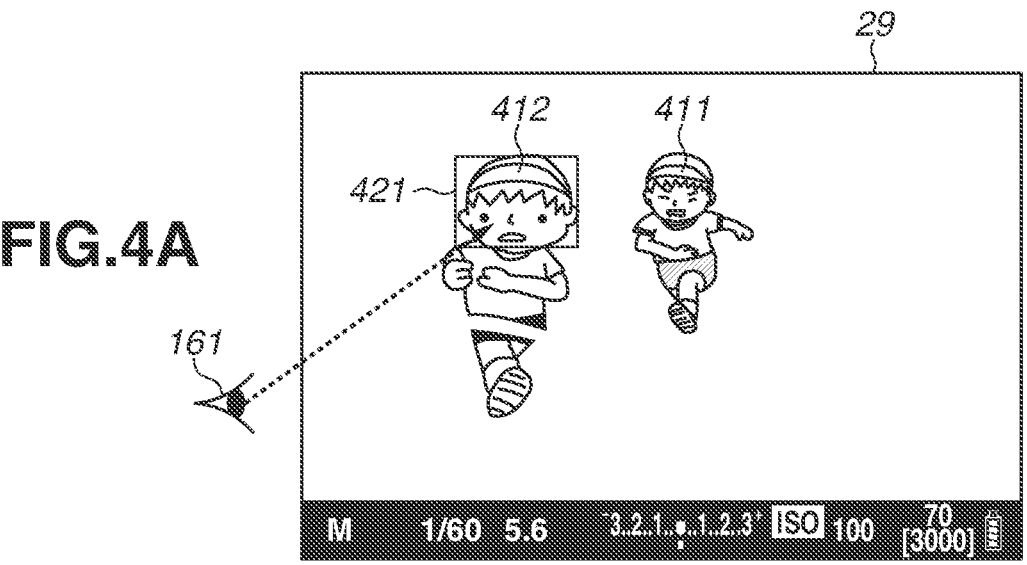
FIGS. 4A to 4H are examples of display of the AF frame based on a line-of-sight input and an operation member according to the present exemplary embodiment.

In step S302, the system control unit 50 displays the AF frame at a line-of-sight position detected by the line-of-sight detection block 160 and starts continuous AF at the position of the AF frame. If the determination is Yes in step S301, the line-of-sight AF setting is enabled. Thus, the system control unit 50 displays the AF frame by tracking the line-of-sight position and executes AF at the line-of-sight position. FIGS. 4A to 4H illustrate examples of display performed on the EVF 29. The examples of display illustrated in FIGS. 4A to 4H are examples where a scene where children are running toward a finish line tape on a field day is displayed in LV. As illustrated in FIG. 4A, a frame 421 is displayed at a line-of-sight position viewed by the eye 161 of the user whose eye approaches the EVF 29. The frame 421 is the AF frame. In FIG. 4A, the line of sight of the user is at an object 412. Thus, the frame 421 is displayed on the face of the object 412 as illustrated in FIGS. 4A, and AF is executed on the object 412. If the user moves the line-of-sight position from the object 412 to an object 411, the AF frame moves from the object 412 to the object 411 by tracking the line of sight, and AF is executed on the object 411.

In step S303, the system control unit 50 determines whether the first shutter switch 62 is turned on. If the first shutter switch 62 is turned on (Yes in step S303), the processing proceeds to step S307. If not (No in step S303), the processing returns to step S302. The first shutter switch 62 being turned on refers to the state where the shutter button 61 is half-pressed. If the shutter button 61 is half-pressed, it is assumed that before capturing an image, the user confirms values regarding the capturing of an image, such as the AF (in-focus) position and the photometric value, and makes an image capturing preparation. Thus, it is likely that the user not only confirms the values regarding the capturing of an image, but also confirms the entirety of the image displayed on the EVF 29. In such a case, the user largely moves the line of sight to check the entirety of the image. If, however, the AF frame moves by tracking the line-of-sight movement, the user not only feels troublesome, but also has difficulty in checking the entirety of the image. Thus, if the first shutter switch 62 is turned on, then as will be described below in step S308, even if the line-of-sight AF setting is enabled, the AF frame does not track the line-of-sight position.

In step S304, with reference to the non-volatile memory 56, the system control unit 50 determines whether a setting regarding a line-of-sight pointer is on. If the setting is on (Yes in step S304), the processing proceeds to step S305. If not (No in step S304), the processing proceeds to step S306. In the state where the line-of-sight AF setting is disabled in step S301, nothing is displayed for tracking the line-of-sight position, and the user cannot recognize the line-of-sight position of the user. Thus, the line-of-sight pointer is displayed at the line-of-sight position so that the user can grasp the line-of-sight position. If the setting of the line-of-sight pointer is enabled, the pointer is displayed at the line-of-sight position, and thereby the user can recognize the line-of-sight position of the user. Consequently, even in a case where the line-of-sight AF setting is disabled, the user can recognize the line-of-sight position of the user and then perform an operation based on the line of sight when, for example, the user selects a menu item or an icon based on the line of sight or executes a specific function based on the moving direction of the line of sight as another function using the line of sight. In a case where the setting of the line-of-sight pointer is disabled, even if the line-of-sight position moves, the pointer does not track the line-of-sight position. Thus, even if a line-of-sight movement unintended by the user is made, the user does not feel troublesome. Further, the pointer is not displayed in a superimposed manner on a menu item. Thus, the visibility of the menu item heightens. The setting regarding the line-of-sight pointer can be optionally made by the user as illustrated in the item 504 in FIG. 5A. As described in step S301, if the line-of-sight AF setting is enabled, the pointer is not displayed at the line-of-sight position regardless of the content of the setting of the line-of-sight pointer. Consequently, even in a case where the line-of-sight AF setting is enabled, and the setting of the line-of-sight pointer is also enabled, both of the AF frame and the pointer are not displayed at the line-of-sight position at the same time. Thus, it is possible to prevent a decrease in the visibility of an LV image.

If the determination is Yes in step S304, then in step S305, the system control unit 50 displays the pointer at the line-of-sight position. As described in step S304, it is only necessary to enable the user to recognize the line-of-sight position of the user. Thus, the display form is not limited to the pointer, and may be any display form so long as the user can recognize the line-of-sight position of the user. For example, if a menu item or an icon is present at the line-of-sight position, the item at the line-of-sight position may be displayed in a highlighted manner, or caused to blink, or displayed in an enlarged manner. Alternatively, the setting item regarding the line-of-sight pointer may not exist. That is, steps S304 and S305 may be omitted, and control may be performed so that the processing proceeds from step S301 to step S306.

In step S306, similarly to step S303, the system control unit 50 determines whether the first shutter switch 62 is turned on. If the first shutter switch 62 is turned on (Yes in step S306), the processing proceeds to step S307. If not (No in step S306), the processing returns to step S304.

In step S307, with reference to the non-volatile memory 56, the system control unit 50 determines whether the AF operation is set to servo AF. If the AF operation is set to the servo AF (Yes in step S307), the processing proceeds to step S308. If not (No in step S307), the processing proceeds to step S324. The servo AF is an image capturing mode suitable for capturing an object from which the imaging distance constantly changes (a moving object), such as an athlete during competition or a moving child or animal. In the servo AF, an object is tracked, and continuous AF is performed on the object. In a case where the AF operation is set to the servo AF, a tracking target is determined at the position of the AF frame at the time when the first shutter switch 62 is turned on, and AF continues to be performed (continuous AF is started) on an object as the tracking target while the user operates the shutter button 61. In contrast, one-shot AF is suitable for capturing a stationary object. In the one-shot AF, AF is executed only once at the position of the AF frame at the time when the first shutter switch 62 is turned on. The setting of the AF operation can be selected between the one-shot AF and the servo AF by the user as illustrated in the item 501 in FIG. 5A. In FIG. 5A, a setting candidate 501*a* is selected, and therefore, the AF operation is set to the servo AF. For example, in the examples of display illustrated in FIGS. 4A to 4H, the distance between the digital camera 100 and an object constantly changes. Thus, if the object is tracked by the servo AF, and AF continues to be executed on the tracking target, the user can capture an image in focus as intended by the user. In contrast, in a case of capturing a stationary object such as a flower, if the object is always tracked as in the servo AF, AF may be executed at a position unintended by the user at the moment when an image is captured, and then, images may be captured. Thus, it is likely to be more convenient for the user if the AF position is fixed by the one-shot AF.

Figure 4B:
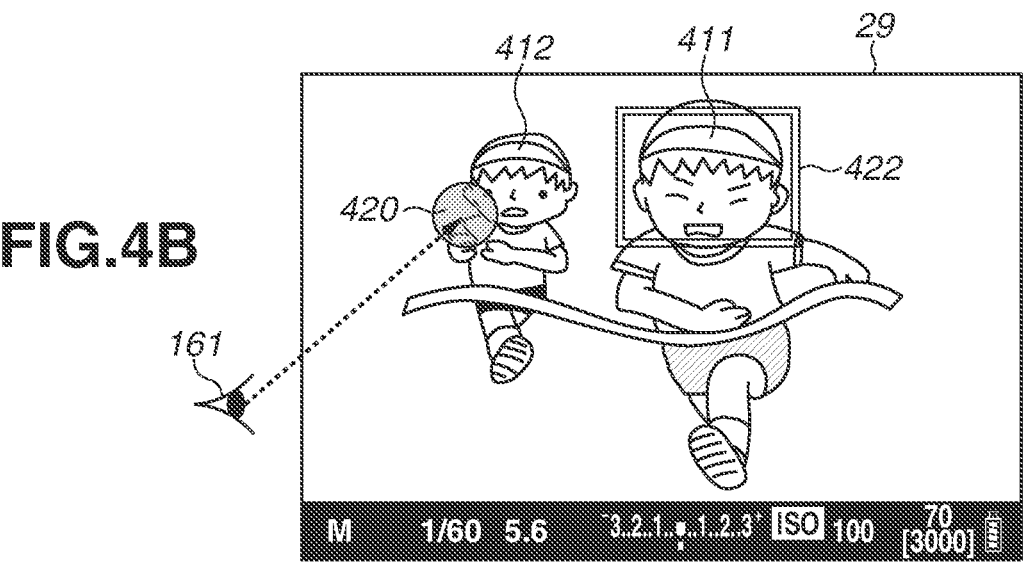

In step S308, the system control unit 50 determines a tracking target at the line-of-sight position (the gaze position) at the time when the first shutter switch 62 is turned on in step S303 or S306. Then, the system control unit 50 starts tracking the tracking target and starts continuous AF on the tracking target. As the process of determining the tracking target, specifically, the feature amounts (the position, the tint, the shape, and the contrast) of an object at the line-of-sight position at this time are extracted and set as tracking conditions. Then, if tracking is started, an object having similar features is tracked in the next frame. If the first shutter switch 62 is turned on in the state illustrated in FIG. 4A, the position of the AF frame 421, i.e., the object 412, is set to a tracking target. Then, tracking is started on the object 412, and continuous AF is started on the object 412. After the first shutter switch 62 is turned on, the AF frame does not move by tracking the line-of-sight position even if the line-of-sight AF setting is enabled. Since the AF frame does not track the line-of-sight position while an operation on the shutter button 61 is performed, it is convenient for the user waiting for a photo opportunity by checking the entirety of the image that the user is capturing. In contrast, even though the line-of-sight AF setting is enabled in step S301, if the AF frame cannot be moved based on a line-of-sight input during an operation on the shutter button 61, the unintended switching of the tracking target prevents the user from intuitively moving the AF frame to a desired position (object) based on a line-of-sight input. For example, as illustrated in FIG. 4A, if the first shutter switch 62 is turned on when the line-of-sight position is at the object 412, and the frame 421, i.e., the AF frame, is displayed on the object 412, and, tracking is started on the object 412, and continuous AF is started on the object 412. When the tracking is started on the object 412, and the continuous AF is performed on the object 412, there is a case where the object 411 passes through a position close to the object 412 and comes closer to the digital camera 100 than the object 412 is (the object 411 overtakes the object 412). In such a case, since the objects 411 and 412 have similar tints and shapes, then as illustrated in FIG. 4B, the tracking target may switch from the object 412 to the object 411. Even though the user wishes to take a photograph focusing on the object 412, the tracking target switches to the object 411 without the user's intention. Thus, tracking is started on an object that is not desired by the user, and it is not convenient for the user. FIG. 4B illustrates an example of display of a tracking frame and the line-of-sight position while the user performs an operation on the shutter button 61. As described above, the user wishes to focus on the object 412 in FIG. 4A, but the tracking target can switch to the object 411 as illustrated in FIG. 4B.

In step S308, aside from a frame 422 indicating a tracking frame, an indicator 420 indicating the line-of-sight position of the user is displayed on the EVF 29. Although the indicator 420 is represented by a circle in FIG. 4B, the display form of the indicator 420 is not limited to this. The indicator 420 may be displayed in any form as long as the user can visually confirm the line-of-sight position of the user and the indicator is not confused with the tracking frame. The tracking frame is a frame indicating that the AF continues to be executed on the tracking target by the continuous AF. The display form of the tracking frame is different from that of the AF frame to avoid confusion between the tracking frame and the AF frame. Although the frame to be displayed is merely differentiated according to the setting of the AF operation, the tracking frame is similar to the AF frame in that AF is executed at the position where the frame is displayed. Consequently, during an operation on the shutter button 61, a tracking target is determined at the position of the AF frame at the time when the operation on the shutter button 61 is started. Then, tracking is started on the tracking target, continuous AF is executed on the tracking target, and an indicator indicating the line-of-sight position is displayed. Since the AF frame does not move to the line-of-sight position during an operation on the shutter button 61, the AF frame and the AF execution position do not move according to the line-of-sight movement of the user. The user, however, can visually confirm the line-of-sight position of the user. Also in a case where the user wishes to update the AF frame to the line-of-sight position, the user can update the AF frame to the line-of-sight position at a timing desired by the user and change the tracking target.

In step S309, the system control unit 50 determines whether a line-of-sight update button is pressed. If the line-of-sight update button is pressed (Yes in step S309), the processing proceeds to step S310. If not (No in step S309), the processing proceeds to step S313. The "line-of-sight update button" refers to, as described above, a dedicated button having the line-of-sight update function or a button to which the line-of-sight update function is assigned. The "line-of-sight update function" refers to the function of updating the AF frame temporarily restricted from tracking the line-of-sight movement to the line-of-sight position after the first shutter switch 62 is turned on. The movement of the AF frame temporarily restricted from tracking the line-of-sight position is updated to the line-of-sight position, thereby moving the AF frame to a position desired by the user. The AF frame is moved to the line-of-sight position, so that, even if the position of the AF frame currently displayed on the EVF 29 and a position desired by the user (the line-of-sight position) are distant from each other, the user can quickly intuitively move the AF frame. As the operation member to which the line-of-sight update function can be assigned, a button to which the line-of-sight update function is assigned can be optionally selected on a setting menu screen by the user, as illustrated in an item 505 in FIG. 5B. If a setting candidate 505*a* is selected, the line-of-sight update function is assigned to the AF-ON button 77. If a setting candidate 505*b* is selected, the line-of-sight update function is not assigned to any of the buttons. Thus, even if any of the buttons is pressed, the AF frame is not updated to the line-of-sight position. In FIG. 5B, the line-of-sight update function is assigned to the AF-ON button 77.

Figure 4C:
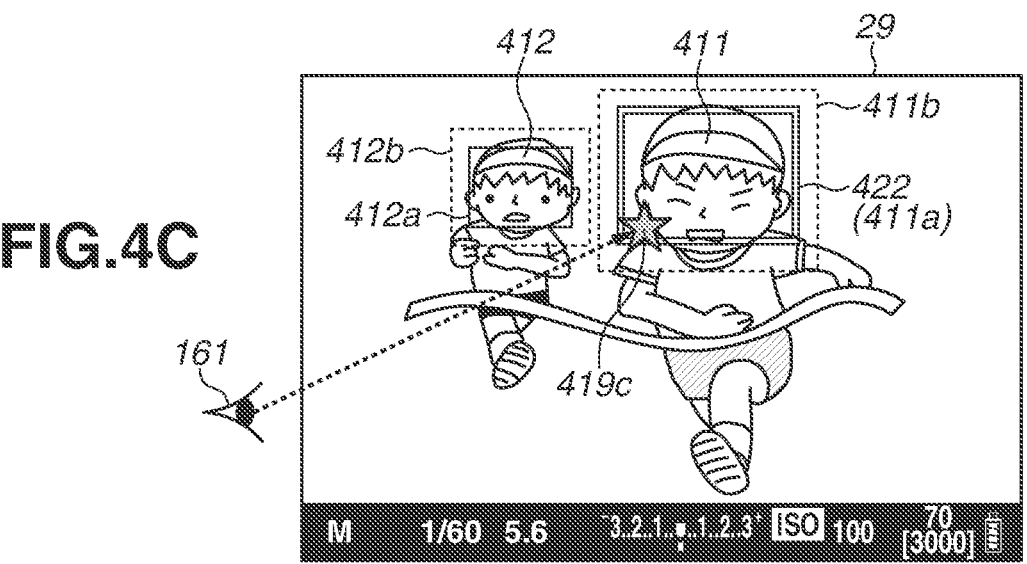

In step S310, the system control unit 50 determines whether the line-of-sight position of the user and the AF frame displayed on the EVF 29 are near each other. If the line-of-sight position of the user and the AF frame displayed on the EVF 29 are near each other (Yes in step S310), the processing proceeds to step S313. If the line-of-sight position of the user and the AF frame displayed on the EVF 29 are not near each other (No in step S310), the processing proceeds to step S311. The line-of-sight position of the user and the AF frame displayed on the EVF 29 being near each other refers to the state where the line-of-sight position is within a predetermined range including the AF frame. The line-of-sight position displayed on the EVF 29 may shift from a position actually viewed by the user under various influences such as the line of sight unconsciously slightly moving due to human characteristics, the number of times of calibration of line-of-sight detection, and the environment. FIG. 4C illustrates a case where the system control unit 50 recognizes an object within a live view image. FIG. 4C indicates a frame (a solid line) indicating an object that is being recognized, a frame (a dotted line) indicating a buffer region around the frame indicating the object, and the tracking frame (a double line). Regarding the object 411 in FIG. 4C, the tracking frame 422 and a frame 411b indicating a buffer region are illustrated. Regarding the object 412, a frame 412a indicating an object that is being recognized and a frame 412b indicating a buffer region are illustrated. The line-of-sight position of the user in FIG. 4C is indicated by an indicator 419c. A frame 411a indicating an object that is being recognized matches the tracking frame 422. The size of a frame indicating a recognized object changes according to the size of the object. A frame indicating a buffer region is represented by a frame slightly larger than the recognized object and has a predetermined range including the recognized object. The frame indicating the buffer region is a frame indicating an area 1.2 times as large as, for example, the area of the frame indicating the recognized object. The size of the frame indicating the buffer region may be optionally set on a setting menu screen by the user, or may fluctuate according to the number of times of calibration or the accuracy of line-of-sight detection, or may be determined in advance. As will be described below, if the torso of the object can be recognized, the size of the frame may be set to include the entirety of the torso of the object. As illustrated in FIG. 4C, when the object 411 is tracked, the user is viewing the position of the indicator 419c. Since the indicator 419c is within the buffer region 411b (within the tracking frame 422), it can be assumed that the user is viewing the object 411. In such a case, the currently tracked tracking target and the line-of-sight position of the user match each other. Thus, even if the line-of-sight update button is pressed, the tracking frame 422 is not updated based on the line-of-sight position. Then, the object 411 is continuously tracked, and the continuous AF is continuously performed on the object 411. A buffer region is thus provided. With the buffer region, even if the detected line-of-sight position and a position viewed by the user shift from each other, the AF frame is updated to the line-of-sight position according to the pressing of the line-of-sight update button in a case where the shift is small. Consequently, it is possible to prevent the situation where, even though the user is viewing a desired object, the AF frame does not move to the line-of-sight position (a position desired by the user). Thus, it is possible to make it less likely to miss a photo opportunity.

Figure 4D:
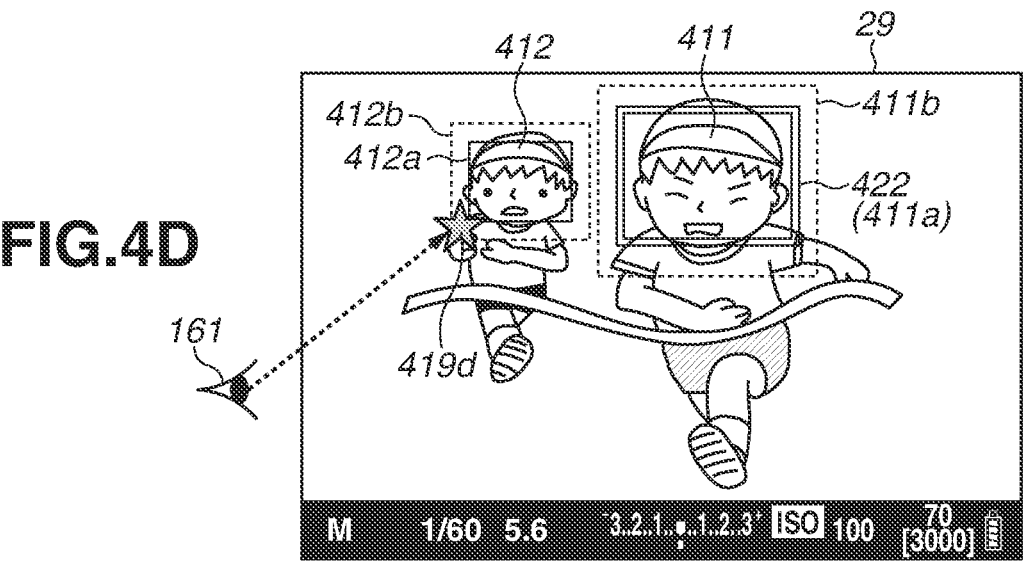

In step S311, the system control unit 50 determines whether a recognized object is present near the line-of-sight position of the user. If a recognized object is present near the line-of-sight position (Yes in step S311), the processing proceeds to step S312. If not (No in step S311), the processing proceeds to step S313. If the determination is No in step S310, the tracking target on which the AF frame is displayed is not near the line-of-sight position. Thus, it can be assumed that the user views a position different from that of the AF frame displayed on the EVF 29. For example, a case is considered where, as illustrated in FIG. 4D, when the frame 422 is displayed on the face of the object 411 as the tracking target, the line-of-sight position is at the position of an indicator 419d. The indicator 419d is not within the frame 411b as the buffer region of the object 411, but is within the frame 412b as the buffer region of the object 412. Based on this, it is determined that the user is viewing the object 412. As described in step S310, regardless of the line-of-sight position not included within the frame 412a, it is determined that the user is viewing the object 412 in a case where the line-of-sight position is included within the buffer region 412b. Consequently, even if the line-of-sight position shifts to some extent, the AF frame can be updated to the line-of-sight position by pressing the line-of-sight update button. Thus, it is possible to capture an image without missing a photo opportunity.

Figure 4E:
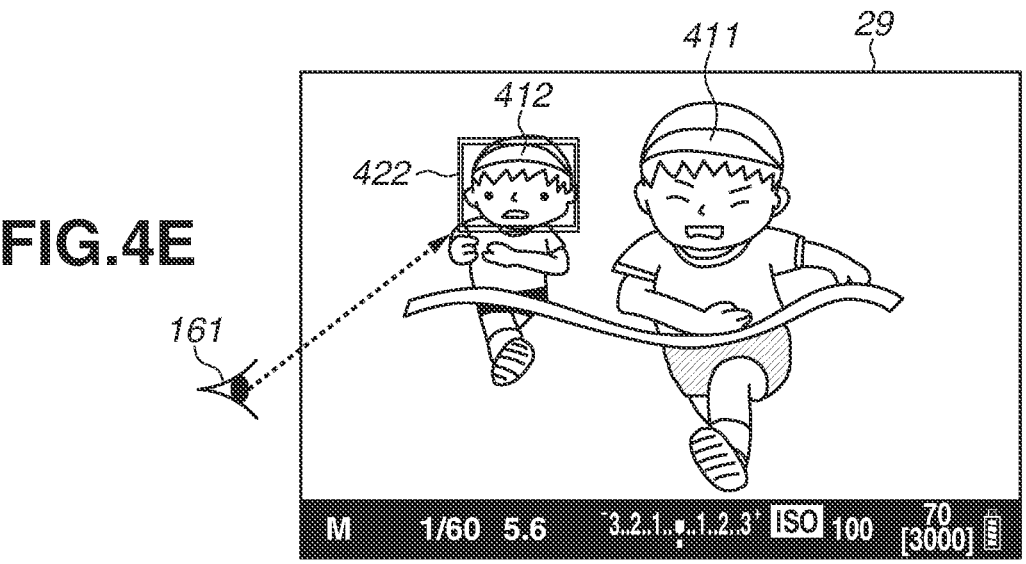

If the determination is Yes in step S311, an object is present near the line-of-sight position of the user. Thus, in step S312, the system control unit 50 changes the tracking target to the object near the line-of-sight position and starts tracking the object. That is, based on the line-of-sight position, the system control unit 50 newly performs the process of determining a tracking target (a specified position or an AF target) (the process described above in step S308) and updates the tracking target. For example, if the line-of-sight update button is pressed in the state illustrated in FIG. 4D, the system control unit 50 determines that the user is viewing the object 412. Then, the system control unit 50 moves the AF frame to the object 412 at the line-of-sight position (updates the tracking target from the object 411 to the object 412). As a result, as illustrated in FIG. 4E, the system control unit 50 starts tracking the object 412 and executes continuous AF on the object 412. Consequently, during the continuation of the half press on the shutter button 61, i.e., during an operation on the shutter button 61, the update of the AF frame to a position based on the line-of-sight position is controlled based on an operation on an operation member. Since the AF frame is not displayed by tracking the line-of-sight position during an operation on the shutter button 61, the AF frame is not moved or AF is not executed without the user's intention. Further, since the AF frame does not move following the line-of-sight movement, it is possible to prevent the user from feeling troublesome. That is, the user can switch (update) the AF frame to the line-of-sight position at a desired timing. Thus, the user can capture an image without feeling troublesome and without missing a photo opportunity.

Figure 4F:
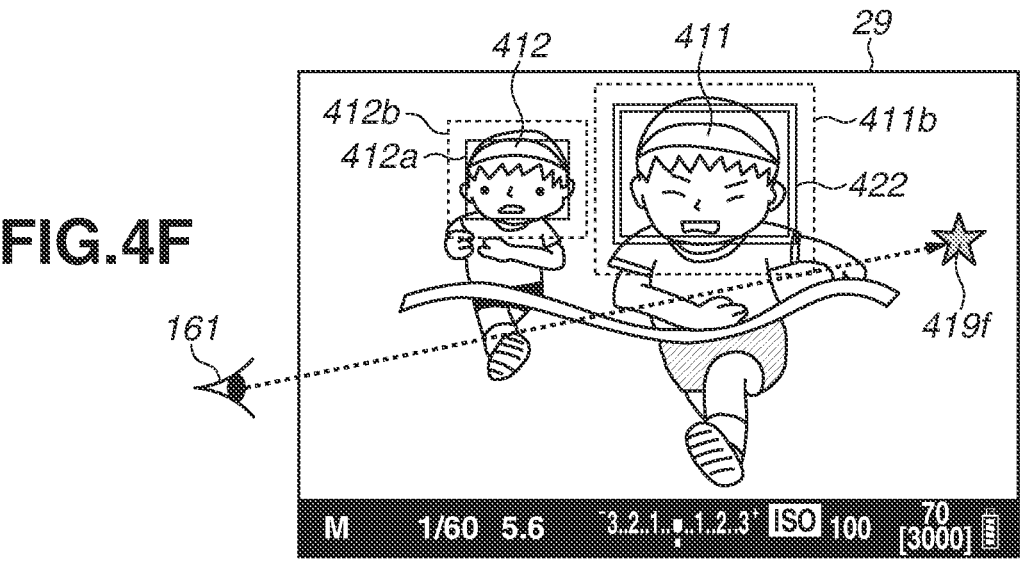

In step S313, the system control unit 50 does not change the tracking target at the position of the AF frame displayed on the EVF 29, but continues the continuous AF. If the determination is Yes in step S310 or the determination is No in step S311, the tracking target is not near the line-of-sight position, or an object is not present near the line-of-sight position. For example, a case is considered where, as illustrated in FIG. 4F, the line-of-sight position of the user is at the position of an indicator 419f. In such a case, the line-of-sight position is not included within either of the frames 411b and 412b. Thus, it is determined that the user is not viewing either of the objects 411 and 412. Thus, even if the line-of-sight update button is pressed, the tracking target is not updated to the line-of-sight position. By executing the determination processes in steps S310 and S311, it is possible to avoid the AF frame from moving to a portion where an object is not present, such as the position of the indicator 419f in FIG. 4F. Thus, for example, it is possible to prevent AF from being executed at infinity. If AF is executed at the position where an object is not present, the user needs to select a desired object again and execute AF. Thus, the user may miss a photo opportunity. To avoid such an issue, the determinations in steps S310 and S311 are made, whereby it is possible to avoid the movement of the AF frame as described above. Thus, it can be more convenient for the user.

In step S314, the system control unit 50 determines whether the first shutter switch 62 is turned off. If the first shutter switch 62 is turned off, i.e., the half press on the shutter button 61 is ended (Yes in step S314), the processing proceeds to step S328. If not (No in step S314), the processing proceeds to step S315.

In step S315, the system control unit 50 determines whether the second shutter switch 64 is turned on. If the second shutter switch 64 is turned on, i.e., the shutter button 61 is full-pressed (Yes in step S315), the processing proceeds to step S316. If not (No in step S315), the processing returns to step S309.

In step S316, the system control unit 50 starts the operation of the image capturing process described above.

In step S317, the system control unit 50 determines whether the on state of the second shutter switch 64 is continued, i.e., the full press on the shutter button 61 is continued. If the on state of the second shutter switch 64 is continued (Yes in step S317), the processing proceeds to step S318. In step S318, the system control unit 50 performs processing during continuous image capturing. If not (No in step S317), the processing returns to step S314.

In step S318, similarly to step S309, the system control unit 50 determines whether the line-of-sight update button is pressed. If the line-of-sight update button is pressed (Yes in step S318), the processing proceeds to step S319. If not (No in step S318), the processing proceeds to step S322.

In step S319, similarly to step S310, the system control unit 50 determines whether the line-of-sight position of the user and the currently displayed AF frame are near each other. If the line-of-sight position of the user and the currently displayed AF frame are near each other (Yes in step S319), the processing proceeds to step S322. If not (No in step S319), the processing proceeds to step S320.

In step S320, similarly to step S311, the system control unit 50 determines whether a recognized object is present near the line-of-sight position of the user. If a recognized object is present (Yes in step S320), the processing proceeds to step S321. If not (No in step S320), the processing proceeds to step S322.

If the determination is Yes in step S320, an object is present near the line-of-sight position of the user. Thus, in step S321, similarly to step S312, the system control unit 50 changes (updates) the tracking target to the object near the line-of-sight position and starts tracking the object.

In step S322, similarly to step S313, the system control unit 50 does not change the tracking target, and continues the continuous AF.

In step S323, similarly to step S316, the system control unit 50 starts the operation of the image capturing process described above, and the processing returns to step S317. The capturing of an image at this time is capturing of the second or subsequent image by continuous image capturing. Next, the processing proceeds to step S317.

If, on the other hand, it is determined in step S307 that the AF operation is not set to the servo AF, i.e., the AF operation is set to the one-shot AF (NO in step S307), the processing proceeds to step S324.

In step S324, the system control unit 50 displays the AF frame at the line-of-sight position (the gaze position) at the time when the first shutter switch 62 is turned on in step S303 or S308. Then, the system control unit 50 executes AF. In a case of the one-shot AF, the system control unit 50 does not perform tracking.

In step S325, similarly to step S315, the system control unit 50 determines whether the second shutter switch 64 is turned on. If the second shutter switch 64 is turned on, i.e., the shutter button 61 is full-pressed (Yes in step S325), the processing proceeds to step S326. If not (No in step S325), the processing proceeds to step S327.

In step S326, similarly to steps S316 and S323, the system control unit 50 starts the operation of the image capturing process described above, and the processing returns to step S325.

In step S327, similarly to step S314, the system control unit 50 determines whether the first shutter switch 62 is turned off. If the first shutter switch 62 is turned off, i.e., the half press on the shutter button 61 is ended (Yes in step S327), the processing proceeds to step S328. If not (No in step S327), the processing returns to step S325.

In step S328, the system control unit 50 determines whether the image capturing standby state is ended by turning off the power supply or transitioning to the reproduction mode. If the image capturing standby state is ended (Yes in step S328), this control flow is ended. If the image capturing standby state is not ended (No in step S328), the processing returns to step S301.

The control in steps S316 to S323 is a control flow performed while the user continues the on state of the second shutter switch 64. That is, the control is performed during continuous image capturing, and even during the continuous image capturing, the AF frame can be updated from the displayed AF frame to the line-of-sight position according to the pressing of the line-of-sight update button and based on the positional relationship between the line-of-sight position and a recognized object. Consequently, even while capturing an image, the user can quickly move the AF frame to a desired object. It is assumed that, during continuous image capturing, the user captures a fast-moving object under more severe constraints, such as the number of images that can be continuously captured and the speed at which images can be continuously captured, than in an image capturing standby state. Thus, the user wishes to miss fewer photo opportunities than in the image capturing standby state. Even in such a situation, the user can switch (update) the AF frame to the line-of-sight position at a desired timing and capture an image without feeling troublesome and without missing a photo opportunity.

Figure 4G:
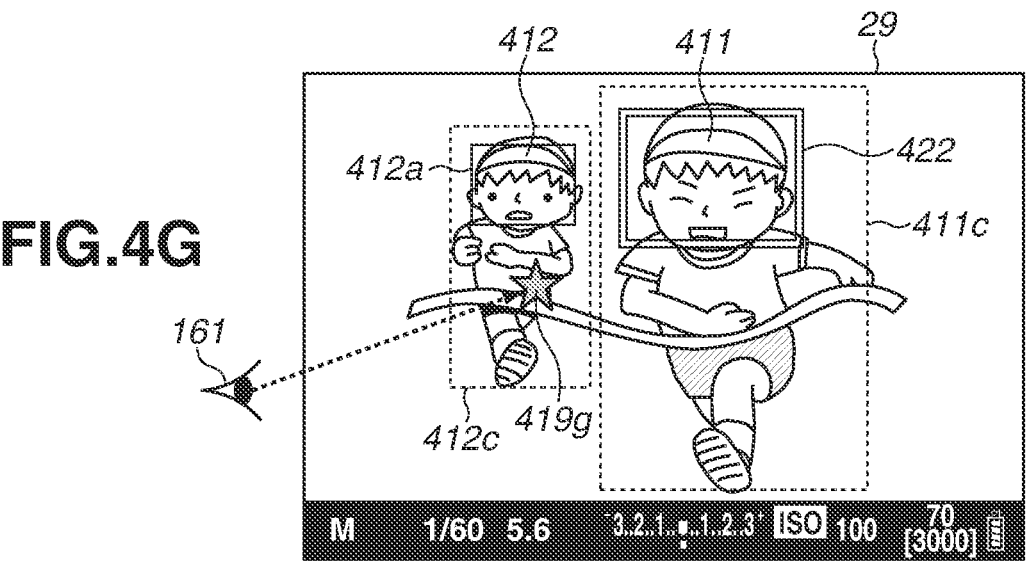
Figure 4H:
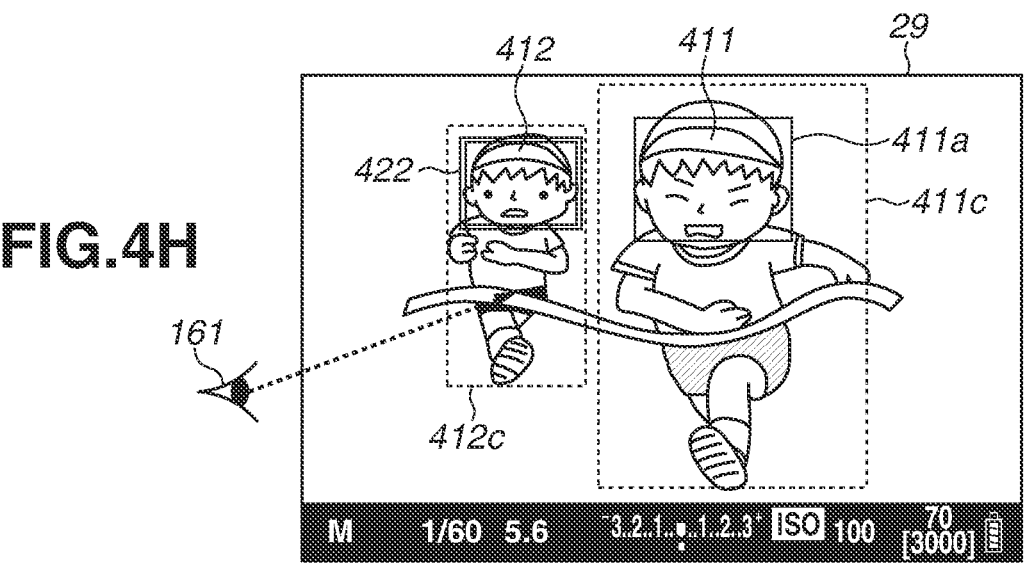

A technique for recognizing particularly the face of a person is utilized in this control flow as in the object recognition in steps S310, S311, S319, and S320 where the presence or absence of an object is determined using the technique. The present disclosure, however, is not limited to the face of a person. For example, the torso of a person, an animal (a dog or a cat), or a vehicle (a train, an airplane, or a car) may be recognized and utilized in this control flow. For example, in a case where, as illustrated in FIG. 4G, the recognition of the torso of a person is successful, a buffer region may be expanded to include the torso as in a region 411c or 412c. That is, suppose that in step S311 or S320, in a case where the object 411 is the tracking target, the line-of-sight position is at the position of an indicator 419g during an operation on the shutter button 61. As illustrated in FIG. 4G, when it is determined that the user is viewing the torso of the object 412 at the position of the indicator 419g, and when the line-of-sight update button is pressed, the tracking target may be changed from the object 411 to the object 412 (FIG. 4H). Not only is a buffer region expanded to the torso of a person, but also control may be performed so that, even in a case where the detection of the face of the tracking target determined in step S308 is failed, the torso is tracked if the detection of the torso of the tracking target is successful. If the face becomes able to be detected by tracking the torso, the user can easily select the face of a desired object. Similarly, if the recognition of not only a person but also an animal or a vehicle is successful, this control flow can be applied. Even if the recognition of any of the above objects is failed, an object can also be tracked based on the LV image.

In FIGS. 4C, 4D, 4F, and 4G, to clearly illustrate the line-of-sight position of the user in an easily understandable manner, each of the indicators 419c, 419d, 419f, and 419g is represented by a star shape. Alternatively, the line-of-sight position may be represented by a circle as in the indicator 420 in FIG. 4B, instead of an indicator in a star shape. Further, as illustrated in FIGS. 4C and 4D, if it is determined that the line-of-sight position is at an object, an indicator indicating the line-of-sight position may not be displayed, and an indicator may be displayed on an object that the user is presumed to be viewing. In this case, to avoid confusion between the indicator and the frame 422 indicating the tracking frame or the frame 421 indicating the AF frame, the display form of the indicator may be different from that of the frame by changing the display color of the indicator or masking the inside of the frame.

Also in the present exemplary embodiment, a configuration may be employed in which the pressing of the touch panel 70a can be detected. Then, according to the pressing of the touch panel 70a, the processing described above according to the pressing of the line-of-sight update button may be performed.

Alternatively, according to a touch-down, processing may be performed similarly to the turning on of the first shutter switch 62. Then, according to the pressing of the touch panel 70a, the processing described above according to the pressing of the line-of-sight update button may be performed. In this case, according to a touch-down, processing may be performed similarly to the turning on of the second shutter switch 64. That is, according to a touch on the touch panel 70a, tracking is started, and an image is captured. If the touch-on continues, continuous image capturing is performed. If the touch panel 70a is pressed, a tracking target is updated. Alternatively, according to a touch-up, processing may be performed similarly to the turning on of the second shutter switch 64.

As described above, in the present exemplary embodiment, the movement of an AF frame (the update of a tracking target) based on a line-of-sight input is controlled based on an operation on an operation member during an operation on a shutter button. Consequently, a user can switch the tracking of the AF frame to a line-of-sight position with user-friendliness without feeling troublesome. Further, the operation member is placed in the range where the user can operate the operation member during an operation on the shutter button. This makes it possible to switch the tracking of the AF frame to the line-of-sight position without affecting an operation on the shutter button, and capture an image by performing AF at a position desired by the user without missing a photo opportunity.

In the present exemplary embodiment, an example of the digital camera 100 including the EVF 29 has been described. The present disclosure, however, is not limited to this. The present disclosure is also applicable to a device having an image capturing function that does not use an EVF. Specifically, if an LV image is displayed on a display unit, and the line-of-sight position of a user viewing the display unit can be detected, the present disclosure is also applicable to a case where the user performs an image capturing operation while viewing the LV image displayed on the display unit. That is, the present disclosure is applicable to a personal computer, a mobile phone terminal, a mobile image viewer, a music player including a display, a game apparatus, and a wearable device such as a head-mounted display.

As described above, if a line-of-sight input is provided, a specified position, i.e., an AF frame, is not moved based on the line-of-sight input during an operation on a shutter button, but the specified position is moved to a line-of-sight position according to an operation performed on a predetermined operation member. Consequently, it is possible to, during an operation on a shutter button, update the specified position based on a line-of-sight position at a timing desired by a user with user-friendliness.

The various types of control performed by the system control unit 50 in the description may be performed by a single piece of hardware, or the processing may be shared by a plurality of pieces of hardware (e.g., a plurality of processors or circuits) to control the entirety of the apparatus.

Other Exemplary Embodiments

The present disclosure can be achieved also by performing the following process. This is the process of supplying software (a program) for achieving the functions of the above exemplary embodiment to a system or an apparatus via a network or various storage media, and of causing a computer (or a central processing unit (CPU) or a microprocessor unit (MPU)) of the system or the apparatus to read and execute a program code. In this case, the program and a storage medium that stores the program constitute the present disclosure.

According to the present disclosure, a specified position can be updated based on a line-of-sight position at a timing desired by a user during an operation on a shutter button.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An imaging apparatus comprising:
an image sensor;
a specific operation member; and
a memory and at least one processor which function as:
a control unit configured to control a display unit to display an autofocus (AF) frame indicating an AF position together with a live image obtained by capturing by the image sensor; and
a line-of-sight detection unit configured to detect a position of a line-of-sight of a user in order to specify the AF position using the line-of-sight of the user,
wherein the control unit performs control so that,
(i) in response to a predetermined operation on the specific operation member,
in a first AF mode, an object as a tracking target is determined based on the detected position of the line-of-sight, the object as the tracking target is tracked, and the AF position is moved according to a movement of the object as the tracking target and,
in a second AF mode, the AF position is determined based on the detected position of the line-of-sight and, even if the detected position of the line-of-sight has been moved, the determined AF position is fixed without being moved, and
(ii) while no operation is performed on the specific operation member,
in a case where a predetermined setting regarding the line-of-sight is set, the AF frame is displayed following the position of the line-of-sight detected by the line-of-sight detection unit, and a line-of-sight pointer indicating the position of the line-of-sight is not displayed, and
in a case where the predetermined setting regarding the line-of-sight is not set, the AF frame is displayed without moving the AF frame based on the position of the line-of-sight detected by the line-of-sight detection unit, and the line-of-sight pointer is displayed following the position of the line-of-sight detected by the line-of-sight detection unit.

2. The imaging apparatus according to claim 1, wherein, in the second AF mode, the control unit performs control so that, in response to the predetermined operation on the specific operation member, the AF position is determined based on the detected position of the line-of-sight and the determined AF position is not moved by tracking an object.

3. The imaging apparatus according to claim 1, wherein, in the first AF mode, the control unit performs control so that, in response to the predetermined operation on the specific operation member, the object as the tracking target is determined based on a position of a line-of-sight detected by the line-of-sight detection unit at the timing of the predetermined operation being performed and, in the second AF mode, in response to the predetermined operation on the specific operation member, the AF position is determined based on the position of the line-of-sight detected by the line-of-sight detection unit at the timing of the predetermined operation being performed.

4. The imaging apparatus according to claim 1, wherein the first AF mode is an AF mode for capturing a moving object and the second AF mode is an AF mode for capturing a still object.

5. The imaging apparatus according to claim 4, wherein the first AF mode is a servo AF mode and the second AF mode is a one-shot AF mode.

6. The imaging apparatus according to claim 1, wherein the control unit performs control so that, in the first AF mode, in response to the predetermined operation on the specific operation member, the object as the tracking target is determined and an AF operation is continuously performed on the determined object and, in the second AF mode, in response to the predetermined operation on the specific operation member, the AF position is determined based on the detected position of the line-of-sight and one AF operation is performed on the determined AF position.

7. The imaging apparatus according to claim 1, wherein the control unit performs control so that, in the first AF mode, in response to the predetermined operation on the specific operation member, the object as the tracking target is determined and continuous AF is executed on the determined object and, in the second AF mode, in response to the predetermined operation on the specific operation member, the AF position is determined based on the detected position of the line-of-sight and one AF operation is performed on the determined AF position without the continuous AF being executed.

8. The imaging apparatus according to claim 1, wherein the control unit performs control so that, regardless of the predetermined setting, in the first AF mode, in response to the predetermined operation on the specific operation member, the AF frame indicating the AF position and the line-of-sight pointer are displayed in the live image and, in the second mode, in response to the predetermined operation on the specific operation member, the AF frame indicating the AF position are displayed in the live image without displaying the line-of-sight pointer.

9. The imaging apparatus according to claim 1, wherein the predetermined operation on the specific operation member is an operation for giving an instruction to perform an AF operation.

10. The imaging apparatus according to claim 1, wherein the predetermined operation on the specific operation member is a half press on a shutter button.

11. The imaging apparatus according to claim 1, wherein the control unit performs control so that, in the second AF mode, in a case where the predetermined operation on the specific operation on the specific operation member is newly performed after the AF position has been determined based on the detected position of the line-of-sight in response to the predetermined operation on the specific operation member, the determined AF position is changed to a position of a line-of-sight detected by the line-of-sight detection unit in response to the newly performed predetermined operation on the specific operation member.

12. The imaging apparatus according to claim 1, wherein the control unit performs control so that, in the second AF mode, in a case where the predetermined operation on the specific operation member is continued, the AF position determined based on the predetermined operation is fixed.

13. The imaging apparatus according to claim 6, wherein the control unit performs control so that, in the first AF mode, in response to the predetermined operation on the specific operation member, the object as the tracking target is determined based on the detected position of the line-of-sight and, during a continuation of the predetermined operation, an AF operation is continuously performed on the determined object.

14. The imaging apparatus according to claim 1, further comprising a setting unit configured to set a line-of-sight AF function to be enabled or disabled,
wherein the case where the predetermined setting is set is a case where the line-of-sight AF function is set to be enabled, and the case where the predetermined setting is not set is a case where the line-of-sight AF function is set to be disabled.

15. A method for controlling an imaging apparatus including an image sensor and a specific operation member, the method comprising:
controlling a display unit to display an autofocus (AF) frame indicating an AF position together with a live image obtained by capturing by the image sensor; and
detecting a position of a line-of-sight of a user in order to specify an autofocus (AF) position using the line-of-sight of the user,
wherein, in the controlling, control is performed so that:
(i) in response to a predetermined operation on the specific operation member,
in a first AF mode, an object as a tracking target is determined based on the detected position of the line-of-sight, the object as the tracking target is tracked, and the AF position is moved according to a movement of the object as the tracking target and,
in a second AF mode, the AF position is determined based on the detected position of the line-of-sight and, even if the detected position of the line-of-sight has been moved, the determined AF position is fixed without being moved,
(ii) while no operation is performed on the specific operation member,
in a case where a predetermined setting regarding the line-of-sight is set, the AF frame is displayed following the position of the line-of-sight detected by the line-of-sight detection unit, and a line-of-sight pointer indicating the position of the line-of-sight is not displayed, and,
in a case where the predetermined setting regarding the line-of-sight is not set, the AF frame is displayed without moving the AF frame based on the position of the line-of-sight detected by the line-of-sight detection unit, and the line-of-sight pointer is displayed following the position of the line-of-sight detected by the line-of-sight detection unit.

16. A non-transitory computer-readable recording medium that stores a program causing a computer to execute the control method according to claim 15.

* * * * *